United States Patent
Makii

(10) Patent No.: US 7,477,310 B2
(45) Date of Patent: Jan. 13, 2009

(54) IMAGING APPARATUS WITH IRIS AND ELECTRO-CHROMIC INFRARED ADJUSTMENT FOR NIGHT SHOT SHOOTING

(75) Inventor: Tatsuo Makii, Tokyo (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 10/691,783

(22) Filed: Oct. 23, 2003

(65) Prior Publication Data

US 2004/0135916 A1 Jul. 15, 2004

(30) Foreign Application Priority Data

Oct. 25, 2002 (JP) .............................. 2002-311570

(51) Int. Cl.
*H04N 5/225* (2006.01)
(52) U.S. Cl. .................. 348/342; 348/335; 348/224.1
(58) Field of Classification Search ................ 348/335, 348/342, 224.1
See application file for complete search history.

(56) References Cited

U.S. PATENT DOCUMENTS

| | | | | |
|---|---|---|---|---|
| 6,208,393 | B1 * | 3/2001 | Bawolek et al. ............. | 349/106 |
| 6,362,921 | B1 * | 3/2002 | Iida et al. .................... | 359/627 |
| 6,667,471 | B2 * | 12/2003 | Bos et al. ................. | 250/208.1 |
| 6,914,634 | B2 * | 7/2005 | Yoshioka et al. ............. | 348/341 |
| 6,952,233 | B2 * | 10/2005 | Nagano .................... | 348/224.1 |
| 6,963,437 | B2 * | 11/2005 | Bauer et al. ................. | 348/342 |
| 2002/0012052 | A1 * | 1/2002 | Nagano ...................... | 348/228 |
| 2003/0227664 | A1 * | 12/2003 | Agrawal et al. ............. | 359/269 |

FOREIGN PATENT DOCUMENTS

| | | |
|---|---|---|
| JP | 4 70720 | 3/1992 |
| JP | 6 319174 | 11/1994 |
| JP | 11 160739 | 6/1999 |
| JP | 2000 184285 | 6/2000 |
| JP | 2000 194046 | 7/2000 |
| JP | 2000 209510 | 7/2000 |
| JP | 2001 57676 | 2/2001 |
| JP | 2002 16838 | 1/2002 |

* cited by examiner

*Primary Examiner*—Lin Ye
*Assistant Examiner*—Gevell Selby
(74) *Attorney, Agent, or Firm*—Frommer Lawrence & Haug LLP; William S. Frommer

(57) ABSTRACT

An optical unit is provided to ensures what is called a night shot function and a night framing function, and to achieve considerable reduction in thickness and size of an optical barrel and a collapsible lens without using an infrared cutoff filter nor a drive mechanism for moving the filter in and out. The optical unit, including a fixed ring, a rear barrel, and a solid state image sensor disposed at a rear portion of the fixed ring, is provided with a liquid crystal panel or an electrochromic device placed at a front side portion on an optical axis of the solid state image sensor for adjusting an amount of infrared electromagnetic wave to be transmitted.

1 Claim, 12 Drawing Sheets

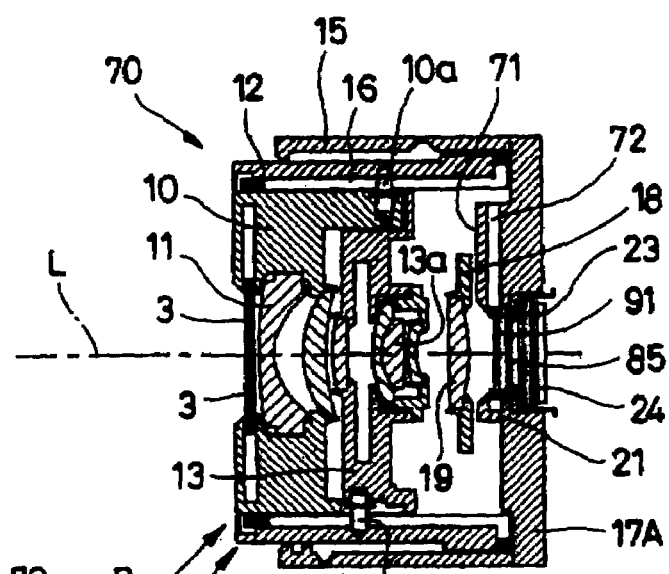
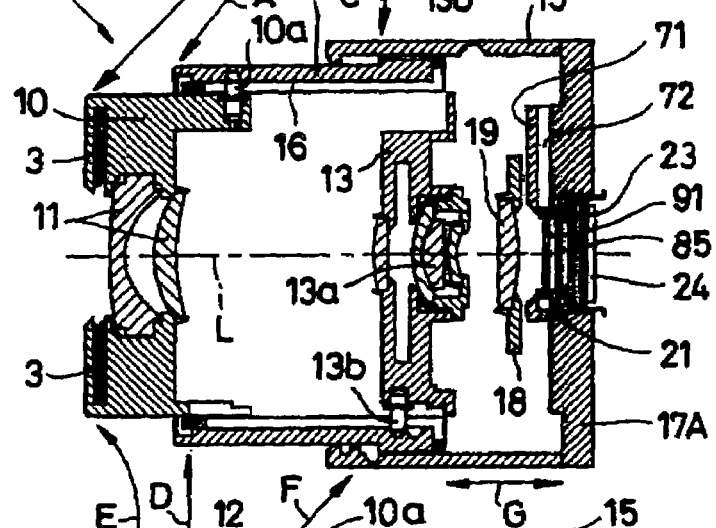
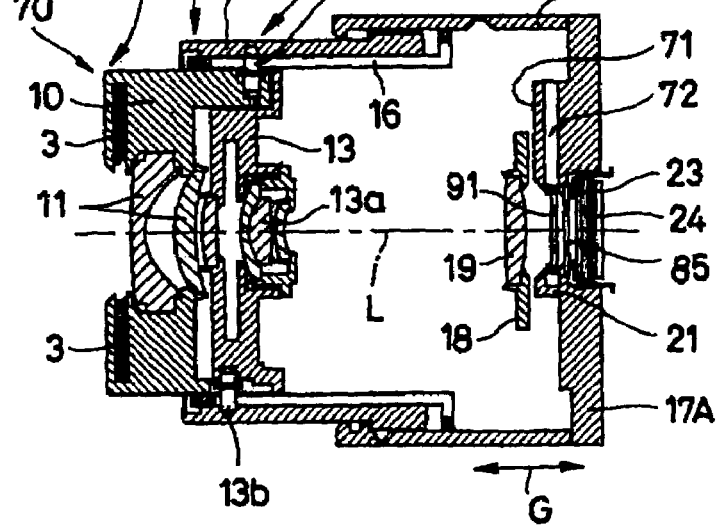

IMAGING APPARATUS WITH IRIS AND ELECTRO-CHROMIC INFRARED ADJUSTMENT FOR NIGHT SHOT SHOOTING

BACKGROUND OF THE INVENTION

1. Field of the Invention

The present invention relates to an optical unit having an optical barrel and an imaging means disposed on an optical axis thereof; a collapsible optical unit having a fixed barrel, at least one lens barrel enabled to move along an optical axis thereof with respect to the fixed barrel and an imaging means disposed on an optical axis thereof; and an imaging apparatus having the optical unit, such as digital still cameras and digital video cameras, respectively having these optical units. More specifically, the present invention relates to an optical unit and an imaging apparatus having the optical unit, which are configured to perform night shooting, such as what is called "night shot shooting" (to be described later) and what is called "night framing shooting" (to be described later), without using an infrared cutoff filter.

2. Description of the Related Art

In recent years, improvement in portability and usability has been demanded of imaging apparatuses, such as digital still cameras and digital video cameras. Thus, miniaturization of the entire apparatus has been pursued. Also, miniaturization of an optical system lens barrel and lenses used in an imaging apparatus has been advanced. Additionally, demands for a further improvement in picture quality and a further increase in the number of pixels of an image taken by a camera have been very strong. Even when lenses serving as constituent members of an optical system are enlarged, it may be demanded that an optical system lens barrel is miniaturized by miniaturization of a drive mechanism.

Also, from the viewpoint of improvement in portability, reduction in size and thickness of what is called a collapsible lens used in an imaging apparatus, such as a digital still camera or a digital video camera, has been demanded. In an imaging apparatus, such as a digital still camera or a digital video camera, a solid-state image sensor, such as a CCD image sensor or a CMOS image sensor, receives an image light of an object, which is formed by an optical barrel, and outputs the image light of the object in the form of an electric signal by performing photoelectric conversion on the received image light to thereby generate the signal corresponding to the image of the object.

Incidentally, solid state image sensors, such as CCD image sensors and CMOS image sensors, perform geometrically discrete sampling. Therefore, when a geometrical pattern (for example, a hair pattern, a striped pattern, and a tiled pattern), whose cycle is finer than the pitch of a periodical arrangement of pixels of an image sensor, is taken by a camera, false color signals or moirés are generated. Thus, related art image sensors have a drawback in that a feeling of incongruity about the image is created. Generally, blurring is applied to an image by an optical lowpass filter so as to remove unnecessary high frequency components. Various "blurring" means utilizing diffraction phenomena, birefringence, and spherical aberration caused by optical lowpass filters have been proposed and implemented.

Generally, the solid state image sensors, such as CCD image sensors and CMOS image sensors, have high sensitivity not only in visible region but in infrared region. Therefore, in the case that unnecessary infrared frequencies are not cut off, correct color reproduction cannot be achieved. Infrared cutoff filters are used for cutting off unnecessary infrared frequencies. The infrared cutoff filter serves not only to cut off infrared radiation but to adjust color reproduction in long wavelength region because the infrared cutoff filter provides a gentle absorption curve in a range of colors from orange to red. The infrared cutoff filter includes not only the absorption type using glass or a plastic material but the type that cuts off part of transmitted light by reflecting infrared radiation.

Typical imaging apparatuses, such as digital still cameras and digital video cameras, use infrared cutoff filters so as to pursue high color reproducibility, as above-mentioned (see Japanese Patent Application Laid-Open No. 4-33481, page 2 and FIG. 1). The infrared cutoff filter is enabled to be disposed on an optical path and to be detached therefrom. Even in a completely dark environment in which no image can be taken by using ordinary imaging apparatuses, such as digital still cameras and digital video cameras, an image can be taken by using an infrared lamp (that is, performing night shot function) to thereby irradiate an object with infrared light, without using a flashing device, such as a photoflash, and a light emitting device, such as a lighting system.

Recently, the applicant of this application has developed not only the night shot function (that is, an infrared shooting function) but a function (that is, "night framing" function) 30 of managing to perform both operations of framing in a dark location and recording an image in a natural hue by placing an infrared cutoff filter on an optical axis of a lens and retreating the infrared cutoff filter therefrom. This function is to perform shooting of an image with natural color reproduction by retracting an infrared cutoff filter out of the optical axis.

FIG. 5 is a perspective view illustrating an outside appearance of, for example, a digital still camera having a collapsible lens, put into a state in which the lens is stored when the digital still camera is not used, that is, at the folding position of the lens. FIG. 6 illustrates the camera put in a used state in which a lens barrel is extended.

FIGS. 7A to 7C and 8A to 8C show a related art collapsible lens. That is, FIGS. 7A to 7C show the shape of an outside appearance of the optical unit of the collapsible lens. FIG. 7A is a perspective view illustrating a folded state of the optical unit. FIG. 7B is a perspective view illustrating a wide state thereof. FIG. 7C is a perspective view illustrating a tele-state thereof. FIG. 8A is a sectional view illustrating a lens accommodating position taken when the camera is not used. FIG. 8B is a sectional view illustrating a wide position (that is, a wide angle position) of the optical unit. FIG. 8C is a sectional view illustrating a tele-position (that is, a telephoto position) thereof. FIG. 9 is an exploded perspective view illustrating the collapsible lens.

First, main functions of the digital still camera are described with reference to FIGS. 5 and 6. Reference numeral 1 designates a camera body portion of the digital still camera. Reference numeral 2 denotes a collapsible imaging lens portion. In the folded state illustrated in FIG. 5, a front lens face of the imaging lens portion 2 is protected by a barrier 3. A finder lens 4, a flash lamp 5, and an autofocus assistance light receiving portion 6 for detecting a distance therefrom to an object to be imaged are disposed on the front face side of the camera body portion 1. Reference numeral 7 represents a finder window, reference numeral 8 indicates a shutter button, and reference numeral 9 designates a mode switching dial.

Next, the detailed configuration of the imaging lens portion 2 serving as a collapsible optical unit is described 10 hereinbelow by referring to FIGS. 7A to 7C and 8A to 8C. The collapsible optical unit described herein is of the type that cannot perform night shooting (that is, does not have the night shot function).

Reference numeral 10 designates a first group lens frame holding a plurality of lenses 11. The first group lens frame 10 has a plurality of cam pins 10a to be fitted into a first cam groove 12a of a cam ring 12. The first group lens frame 10 is formed of, for example, a black polycarbonate resin containing glass fibers and has sufficient strength and light-shielding-ability.

Reference numeral 13 denotes a second group lens frame holding a plurality of lenses 13a. The second group lens frame 13 has a plurality of cam pins 13b to be fitted into a second cam groove 12b of the cam ring 12. The second group lens frame 13 is formed of, for instance, a black polycarbonate resin containing glass fibers and has sufficient strength and light-shielding-ability. An iris shutter mechanism may be provided in the second group lens frame 13.

The cam ring 12 has a gear portion 12c for enabling a gear 14a of a gear unit 14 to rotation-drive this cam ring within an inside diameter portion of a fixed ring 15 and a plurality of cam pins 12d to be fitted into a cam groove 15a. The cam ring 12 is formed of, for example, a black polycarbonate resin containing glass fibers and has sufficient strength and light-shielding-ability. The first cam groove 12a and the second cam groove 12b are respectively formed for performing zooming operations by moving the first group lens frame 10 and the second group lens frame 13 in the direction of an optical axis L along predetermined curves of the first cam groove 12a and the second cam groove 12b.

Reference numeral 16 designates a rectilinear guide ring 16 that is a member adapted to move in the inside of the fixed ring 15 in the direction of the optical axis L in such a way as to be integral with the cam ring 12. This rectilinear guide ring 16 has a plurality of guide grooves 16a for guiding the first group lens frame 10 in the direction of the optical axis, and also has a plurality of guide grooves 16b for guiding the second group lens frame 13 in the direction of the optical axis. This rectilinear guide ring 16 is formed of, for example, a black polycarbonate resin containing glass fibers and has sufficient strength and light-shielding-ability.

The fixed ring 15 is a member to be fixed to a rear barrel 17. This fixed ring 15 is formed of, for instance, a black polycarbonate resin containing glass fibers and has sufficient strength and light-shielding-ability.

Reference numeral 18 designates a third group lens frame holding a lens 19. The third group lens frame 18 is formed of, for instance, a black polycarbonate resin containing glass fibers and has sufficient strength and light-shielding-ability. The third group lens frame 18 is held in such a manner as to be able to move in the direction of the optical axis with respect to the rear barrel 17, and displaced a very small amount in the direction of the optical axis by a power source (not shown), such as a stepping motor.

The fixed ring 15, a barrier drive mechanism 20, and a gear unit 14 are fixed to the rear barrel 17. An optical filter 22 including an optical lowpass filter or an infrared cutoff filter is positioned and fixed to the rear barrel 17 in such a way as to face the third group lens frame 18 and as to be elastically pushed by seal rubber 23. A solid image sensor 24, such as a CCD image sensor or a CMOS image sensor, is positioned in the rear barrel 17 behind the optical filter 22.

The barrier drive mechanism 20 is a projecting member for close-driving the barrier 3 in synchronization with folding of the imaging lens portion 2. The gear unit 14 rotation-drives the cam ring 12 through a gear 14a meshing with the gear portion 12c. A gear ratio thereof is determined so that a sufficient driving force can be obtained in a range from a folded state to a tele-state through a wide state or a range from a tele-state to a folded state through a wide state.

Next, an operation of the imaging lens portion 2 is described hereinbelow.

In an operation performed from the folded state shown in FIG. 8A to the wide state shown in FIG. 8B, the gear 14a of the gear unit 14, which meshes with the gear portion 12c of the cam ring 12, is driven by a drive source, such as a DC motor. Thus, the cam pins 12d move toward an object along the optical axis L while rotating along the cam groove 15a of the fixed ring 15. At that time, the rectilinear guide ring 16 moves in such a way as to be integral with the cam ring 12, as indicated by arrows A.

Simultaneously with this, the cam pins 10a of the first group lens frame 10 move along both the cam groove 12a of the cam ring 12 and the guide groove 16a of the rectilinear guide ring 16, as indicated by arrows B. Simultaneously with this, the cam pins 13b of the second group lens frame 13 move along both the cam groove 12b of the cam ring 12 and the guide groove 16b of the rectilinear guide ring 16, as indicated by arrows C. The above-mentioned operations result in that each of the first group lens frame 10 and the second group lens frame 13 is in optically wide position.

Even in an operation performed between the wide position and the tele-position shown in FIG. 8C, the cam ring 12 is driven by the gear unit 14. In this range, the cam pins 12d move in the substantially horizontal cam groove 15b of the fixed ring 15, so that the cam ring 12 does not move in the direction of the optical axis. Therefore, the rectilinear guide ring 16 does not move in the direction of the optical direction, as indicated by arrows D. At that time, the cam pins 10a of the first group lens frame 10 move along both the cam groove 12a of the cam ring 12 and the guide groove 16a of the rectilinear guide groove 16, as indicated by arrows E.

Simultaneously, the cam pins 13b of the second group lens frame 13 move along both the cam groove 12b of the cam ring 12 and the guide groove 16b of the rectilinear guide ring 16, as indicated by arrows F. The above-mentioned operation results in that the first group lens frame 10 and the second group lens frame 13 moves the optically wide position to the optical tele-position. Thus, the zooming operation is performed. Incidentally, an operation to be performed from the tele-position to the wide position and an operation to be performed from the wide position to the folded position are conducted by reverse-rotation-driving the gear 14a of the gear unit 14 to thereby rotate the cam ring 12 in an opposite direction.

Incidentally, when the first group lens frame 10 and the second group lens frame 13 perform zooming operations, the third group lens frame 18 is displaced a very small amount in the direction of the optical axis by another drive source (not shown), which may include, for instance, a stepping motor. Thus, a focusing operation is performed.

In a folded state of the related art collapsible lens of this configuration, the thickness of the optical filter, such as an optical lowpass filter or an infrared cutoff filter, itself and that of an optical-filter inserting/fixing portion has restricted a range in which the third group lens frame 18 can move in the direction of a solid state image sensor 24, such as a CCD image sensor or a CMOS image sensor. There have been certain limitations on minimum distances in the direction of the solid state image sensor 24 between the third group lens frame 18 and the second group lens frame 13, and between the second lens frame 13 and the first group lens frame 10.

Even if the third group lens frame 18 is moved to a place at which the lens frame 18 touches the rear barrel 17 (that is, the optical-filter inserting/fixing portion), the third group lens frame 18 is moved close to the second group lens frame 13 so that the lens frame 18 touched the second group lens frame 13, and the second group lens frame 13 is moved close to the first group lens frame 10 so that the lens frame 13 touched the lens frame 10, the entire length of the barrel of the imaging lens portion 2 (that is, the collapsible lens) would only be reduced to a certain limit.

The infrared cutoff filter and the optical lowpass filter were glued together and used as the optical filter 22 that was fixed to the rear barrel 17. Thus, it was not possible that the infrared cutoff filter was placed on and retreated out of the optical axis. Accordingly, night shooting could not be achieved by using the related art collapsible lens.

Next, details of the configuration of the imaging lens portion 2 serving as a related art collapsible optical unit of the type enabled to perform night shooting (that is, the type that has a night shot function) are described by referring to FIGS. 10A, 10B, 11C, 11A, 11B, 12 and 13. Technique for this night shooting, that is, night shooting is enabled by placing an infrared cutoff filter on an optical axis and retreating the infrared cutoff filter therefrom. The configuration of the entire optical unit is similar to that of the above-mentioned collapsible optical unit of the type that cannot perform night shooting (that is, does not have the night shot function). Therefore, a constituent element, which is the same as that of the above-mentioned collapsible optical unit, is designated by the same reference character as used for denoting that of the above-mentioned collapsible optical unit. Thus, the description of such a constituent element is omitted herein.

As shown in FIGS. 12 and 13, the rear barrel 17A is provided with a substantially rectangular casing 71 provided on a substantially central portion of a surface of a side opposed to the fixed ring 15. A filter accommodating portion 72 for placing an optical filter (an infrared cutoff filter 91 in this related art imaging lens portion) is provided at an appropriate position in the direction of an optical axis of in this casing 71. An opening portion 73 for passing incident light, which comes from an object, toward a solid state image sensor 24, such as a CCD image sensor or a CMOS image sensor, held by the rear barrel 17A is provided in a front surface portion of the casing 71 corresponding to this filter accommodating portion 72.

A retreating slot 74 for retreating the infrared cutoff filter 91, which is a practical example of an optical filter accommodated in the filter accommodating portion 72, in a direction perpendicular to an optical axis L is provided in a top face portion of the casing 71. Paired guide portions 75, 75 for appropriately guiding, when the infrared cut off filter 91 is subjected to motive power and moves, the infrared cutoff filter 91 in a direction perpendicular to the optical axis are provided on both sides of this retreating slot 74, respectively.

A motive power source attaching portion 77, to which a motive power source 76 for generating motive power to be used for moving the infrared cutoff filter 91 is attached, is provided in an obliquely upper part of one side portion of the rear barrel 17A. For example, a stepping motor can be applied to the motive power source 76. A flange portion 76b for attaching the motive power source 76 to the motive power source attaching portion 77 is provided at a side from which a rotation shaft 76a thereof protrudes. The motive power source 76 is attached to the rear barrel 17A by fixing this flange portion 76b to the motive power source attaching portion 77 through the use of fixing means, such as attaching screws. At that time, the rotation shaft 76a is inserted into a bearing hole 77a.

A turning pin 78 is integrally provided in the rotation shaft 76a of the motive power source 76 through an arm portion 78a. This turning pin 78 is adapted by the arm portion 78a to be shifted from the rotation shaft 76a by a predetermined distance in such a way as to be parallel to the rotation shaft 76a. A fan gear 79, on the peripheral edge of a part of which a gear portion 79a is provided, is provided at a leading end of the rotation shaft 76a. An engaging hole 79b, into which the rotation shaft 76a and the turning pin 78 are inserted, is provided in a central portion of the fan gear 79. The rotation shaft 76a and the turning pin 78 are simultaneously inserted into the engaging hole 79b. Accordingly, the fan gear 79 is integrally rotation-driven by rotation of the rotation shaft 76a.

A pinion gear 80 rotatably supported on a pivoting shaft 76c provided in the flange portion 76b is meshed with the gear portion 79a of the fan gear 79. An arm potion 80a is provided on a part of the outer periphery of the pinion gear 80. A drive pin 81 projecting toward the motive power source 76 is attached to this arm portion 80a. A motive power transmitting mechanism 83 for moving a filter holder 82 consists of these constituent elements, that is, the motive power source 76, the turning pin 78, the fan gear 79, the pinion gear 80, and the drive pin 81.

These constituent elements, such as the fan gear 79, are disposed between the rear barrel 17A and the motive power source 76, and positioned and driven in such a way as to be able to obtain predetermined performance. Incidentally, the motive power transmitting mechanism 83 is not limited to the above-mentioned gear train. For instance, a cam mechanism, a link mechanism, and various mechanisms enabled to transmit motive power can be used as the motive power transmitting mechanism.

The filter holder 82 is adapted to hold the infrared cutoff filter 91 and to move the infrared cutoff filter 91 in a direction perpendicular to the optical axis. The filter holder 82 is provided with a holding portion 82a opened and U-shaped, to which the infrared cutoff filter 91 is attached. Projections 82b for catching an attaching band 84, which closes the opening portion, are provided on both opening-side outer surface of this holding portion 82a, respectively. An elongated hole 82c, with which a drive pin 81 is slidably engaged, is provided in a side opposite to the holding portion 82a of the filter holder 82.

A guide ridge 82d, which is guided by the guide portions 75 of the casing 71 when moved in a direction perpendicular to the optical axis L, is provided on a side opposite to the opening side of the holding portion 82a of the filter holder 82. This filter holder 82 may be formed of, for example, a polycarbonate resin containing glass fibers, and has sufficient strength and light-shielding-ability.

The attaching band 84 is formed of an elastic member, such as a rubber-like elastic body, and provided with a pair of engaging holes 84a to be respectively engaged with the projections 82b. A pushing portion 84b, which elastically pushes the infrared cutoff filter 91 when attached to the attaching band 84, for preventing slip-off of the infrared cutoff filter 91 is provided on this attaching band 84. This attaching band 84 is attached to the opening-side while the infrared cutoff filter 91 is attached to the holding portion 82a. Accordingly, the infrared cutoff filter 91 is positioned at a predetermined place and held by the filter holder 82.

A method of holding the infrared cutoff filter 91 is not limited to a snap fitting method performed by using the attaching band 84. Various other methods, such as a thermal caulking method and a bonding method using an adhesive agent, may be employed as the method of holding the infrared cutoff filter 91.

The infrared cutoff filter 91 is held by the filter holder 82 and moved in a direction perpendicular to the optical axis L. Thus, the infrared cutoff filter 91 is formed in the latter related art lens as an independent member other than an optical lowpass filter 85, differently from the case of the former related art lens.

The optical lowpass filter 85 is needed for image recording by the imaging apparatus even when night shooting, such as infrared shooting, is performed. Thus, in the latter related art lens, the optical lowpass filter 85 is disposed at a front side in the direction of the optical axis of the solid state image sensor 24 attached in the central hole of the rear barrel 17A, and positioned at and fixed to a predetermined place.

A movement mechanism for moving the infrared cutoff filter 91 to between a place located on the optical axis and another place located out of the optical axis is composed of the motive power transmitting mechanism 83 and the filter holder 82. A retreating means 88 for retreating the infrared cutoff filter 91 from the predetermined place located on the optical axis to the predetermined place located out of the optical axis rectilinearly in a direction perpendicular to the optical axis includes the movement mechanism 86 and the casing 71.

Operations of the retreating means 88 are briefly described hereinbelow. First, a description is given of a retreating operation performed in a case that the infrared cutoff filter 91 is moved from the predetermined place located on the optical axis to the predetermined place located out of the optical axis. The drive source 76 is first driven, so that the rotation shaft 76a and the turning pin 78 are rotated in a predetermined rotating direction. Thus, the fan gear 79 formed in such a way as to be integral with the rotation shaft 76a is rotated in the same direction by an equal amount. The rotation of the fan gear 79 causes the pinion gear 80, which is meshed with the gear portion 79a thereof, to rotate in the opposite direction by an amount corresponding to the number of teeth meshed with teeth of the gear portion 79a.

Then, the drive pin 81 turns around the pivoting shaft 76c. While the drive pin 81 moves along the elongated hole 82c, the filter holder 82 is moved in a direction in which the filter holder 82 is drawn out of the filter accommodating portion 72.

Accordingly, the filter holder 82 is guided by the guide portion 75 and moves in a direction perpendicular to the direction of the optical axis. As a result, the infrared cutoff filter 91 held by the filter holder 82 is move from the predetermined place located on the optical axis to the predetermined place located out of the optical axis rectilinearly in a direction perpendicular to the optical axis.

On the other hand, in a case that the infrared cutoff filter 91 is moved from the predetermined place located out of the optical axis to the predetermined place located on the optical axis, the retreating means 88 performs an operation that is reverse equivalent of the above-mentioned retreating operation. Accordingly, the infrared cutoff filter 91 can be moved to the predetermined place located on the optical axis.

A rear end portion of the fixed ring 15 is made to abut against a front face of the rear barrel 17A to which the infrared cutoff filter 91 is attached, and fixed thereto through the use of the fixing means, such as attaching screws, so that the fixed ring 15 is integral with the rear barrel 17A. A plurality of screw receiving portions (not shown), through each of which the attaching screw is passed, are provided in the rear end portion of the fixed ring 15. Moreover, concave portions (not shown) of the number being equal to that of the screw receiving portions are provided in the rear barrel 17A in such a way as to respectively correspond to these screw receiving portions. The fixed ring 15 is positioned at the rear barrel 17A by fitting the screw receiving portions into these concave portions. The fixed ring 15 is fastened and fixed to the rear barrel 17A by being screwed in this state, so that the fixed ring 15 and the rear barrel 17A are integral with each other.

With the above-mentioned configuration, the collapsible lens can perform the night shot function and the night framing function. That is, when the collapsible lens is used as an optical lens in a state between the wide state shown in FIG. 10B and the tele-state shown in FIG. 10C, what is called the night shot shooting and the night framing shooting, which are included in night shooting, can be performed by placing the infrared cutoff filter 91 on the optical axis and retreating the infrared cutoff filter 91 out of the optical axis.

FIGS. 11A and 11B illustrate operations of placing the infrared cutoff filter 91 on the optical axis and of retreating the infrared cutoff filter 91 out of the optical axis. FIG. 11A illustrates a state in which the infrared cutoff filter 91 is set at the predetermined place. FIG. 11B illustrates a state in which the infrared cutoff filter 91 is completely moved from the place on the optical axis to the place located out of the optical axis. In these figures, reference character H indicates a direction in which the infrared cutoff filter 91 is moved.

An example of the imaging apparatus having the above-mentioned collapses optical unit is disclosed, for example, Japanese Patent Application Laid-Open No. 2000-194046 (see pages 3 to 5, and FIGS. 1 to 4). This Japanese Patent Application Laid-Open No. 2000-194046 describes invention relating to an optical unit, such as a camera, which is enabled to move an optical system to a use position and an accommodation position.

This optical apparatus has a first lens unit composing an optical system, a first motor for driving the first lens unit, a second lens unit provided behind the first lens unit composing the optical system, a second motor for driving the second lens unit, and control means for controlling the first and second motors in such a way as to pull in the second lens unit in response to an accommodating instruction, as to start pulling-in of the first lens unit upon completion of pulling in the second lens unit, and as to pull the first lens unit into a space generated by pulling in the second lens unit.

An imaging apparatus using a liquid crystal panel is disclosed in, for example, Japanese Patent Application Laid-Open No. 4-33481 (see page 2, and FIG. 1). This official gazette describes techniques relating to an imaging apparatus, such as a video camera, which has a function of adjusting an amount of incident light.

This imaging apparatus has a lens system for condensing light to form an image on an image sensor, imaging means for converting light, which represents a formed image, into video signals and for outputting the video signals, detecting means for detecting brightness, and a liquid crystal panel that is disposed between the lens system and the imaging means and provided with color filters including an infrared cutoff filter and an infrared pass filter and enabled to control optical transmittance of each of the color filters.

An imaging apparatus having an electrochromic device (hereunder referred to as an "EC device") is disclosed in, for instance, Japanese Patent Application Laid-Open No. 11-160739 (see page 2, and FIG. 1). This Japanese Patent Application describes techniques relating to an imaging apparatus enabled to capture an image light in a specific range of frequencies.

This imaging apparatus has a plurality of EC devices respectively transmitting light rays, whose ranges of frequencies differ from one another, in a light transmission state, and also has control means for controlling at least two of the plurality of EC devices in such a way as to simultaneously be put into a light transmission state, and light receiving means for receiving light having been transmitted by all of at least two of the plurality of EC devices, which have been controlled in such a manner as to be brought into the light transmission state.

SUMMARY OF THE INVENTION

However, the above-mentioned "collapsible lens provided with a night shot function to allow the night shooting", described with reference to FIGS. 10A to 13 requires a mechanism for placing the infrared cutoff filter on the optical axis and for retreating the infrared cutoff filter out of the optical axis. Therefore, the "collapsible lens provided with a night shot function to allow the night shooting" has drawbacks in that the entire length of the lens put in a folded state is long, because of the above stated mechanism. Accordingly, the related art "collapsible lens provided with a night shot function to allow the night shooting" is unsuited for miniaturization of the lens.

Not only the related art "collapsible lens provided with a night shot function to allow the night shooting" but the related art "lens provided with a night shot function to allow the night shooting", as illustrated in FIGS. 3A to 4, require guide members for holding and driving the infrared cutoff filter. Moreover, it is requested for users to place the infrared cutoff filter on the optical axis and retreat this filter therefrom at high speed so as to perform the "night framing function". Thus, a dedicated actuator therefor is needed. Therefore, these related art lenses have a problem in that a further miniaturization of the related optical barrel or the related art collapsible lens is very difficult.

In a folded state of the related art collapsible lens, the thickness of the holding member for the infrared cutoff filter and the guide members for driving the infrared cutoff filter has restricted a range in which the third group lens frame can move toward a solid state image sensor, such as a CCD image sensor or a CMOS image sensor. There have been certain limitations on minimum distances in the direction of the solid state image sensor between the third group lens frame and the second group lens frame and between the second lens frame and the first group lens frame. Even when the third group lens frame was moved to a place at which the lens frame touched the rear barrel (that is, the optical-filter inserting/fixing portion), when the third group lens frame was moved close to the second group lens frame so that the lens frame touched the second group lens frame, and when the second group lens frame was moved close to the first group lens frame so that the lens frame touched the lens frame, the entire length of the barrel of the imaging lens portion (that is, the collapsible lens) could be reduced only to a certain limit.

When the infrared cutoff filter is placed on the optical path and retreated out of the optical axis so as to perform the nigh shooting function, optical path length is changed. To absorb the change in the optical path length, an amount of movement of a frame of a focusing group lens, for example, the third group lens frame illustrated in FIGS. 10A to 13 increases. It is necessary for ensuring a sufficient amount of movement to set the entire optical length at a large value in a stage of optical design. Therefore, the related art lens has a problem in that the entire length of the optical barrel and that of the collapsible lens cannot be reduced. To ensure a sufficient amount of movement of a focusing group lens, the size of a drive mechanism for the focusing group lens, for instance, the third group lens frame illustrated in FIGS. 10A to 13 is increased to a large value. A large space is taken up in the direction of the axis. Thus, the related art has problems in that reduction in size and thickness of an optical barrel cannot be achieved, and that the thickness of a collapsible lens cannot be reduced when the lens is stored.

The present invention is conceived so as to solve or alleviate the above-mentioned drawbacks of the related art, and to provide an optical unit and an imaging apparatus having the optical unit, which ensures executions of the night shot function and the night framing function without using an infrared cutoff filter nor a drive mechanism for moving the infrared cutoff filter in and out, and allows to achieve a further reduction in thickness of an optical barrel and a collapsible lens.

According to an aspect of the present invention, there is provided an optical unit having an optical barrel, and imaging means disposed at a rear side portion on an optical axis of the optical barrel. This optical unit is provided with infrared transmission amount adjusting means, which is provided at a front side portion on an optical axis of the imaging means, for adjusting an amount of infrared electromagnetic wave (or light) to be transmitted.

According to another aspect of the present invention, there is provided an optical unit having a fixed barrel, at lest one lens barrel being enabled to move along a direction of an optical axis thereof with respect to the fixed barrel, and imaging means disposed at a rear side portion on the optical axis of the lens barrel. This optical unit is provided with infrared transmission amount adjusting means, which is provided at a front side portion on an optical axis of the imaging means, for adjusting an amount of infrared electromagnetic wave (or light) to be transmitted.

According to another aspect of the present invention, there is provided an imaging apparatus that may include a camera apparatus, such as a digital still camera and a digital video camera, which includes an optical unit. This optical unit includes an optical barrel, a fixed barrel disposed at a rear side portion on an optical axis of the optical barrel, at least one lens barrel being movable along the optical axis with respect to the fixed barrel, imaging means being disposed at a backside portion on an optical axis of the lens barrel, and infrared transmission amount adjusting means, provided at a front side portion on an optical axis of the imaging means, for adjusting an amount of infrared electromagnetic wave (or light) to be transmitted.

The above-mentioned optical unit may ensure the night shot function and the night framing function by providing infrared transmission amount adjusting means, which is enabled to adjust an amount of transmitted infrared electromagnetic wave (or light), at a front side portion on an optical axis of imaging means without using an infrared cutoff filter and a drive mechanism for moving out and in the infrared cutoff filter. Moreover, a further reduction in thickness and size of an optical barrel and a collapsible lens is enabled.

An imaging apparatus having an optical unit according to the present invention can use an optical unit enabled to achieve miniaturization thereof. Therefore, reduction in size and thickness of the entire imaging apparatus can be achieved.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1A is a sectional view illustrating a folded state in which the lens is stored when the lens is not used; FIG. 1B is a sectional view illustrating a wide state (that is, a wide angle state) of the lens; and FIG. 1C is a sectional view illustrating a tele-state (that is, a telephoto state) thereof;

FIG. 2A is a sectional view illustrating a related art collapsible lens; and FIG. 2B is a sectional view illustrating a collapsible lens according to the present invention;

FIG. 3A is an explanatory view illustrating a normal state thereof; FIG. 3B is an explanatory view illustrating a wide side (that is, a wide angle side) thereof; and FIG. 3C is an explanatory view illustrating a tele-side (that is, a telephoto side) thereof;

FIG. 7A is a perspective view illustrating a folded state thereof; FIG. 7B is a perspective view illustrating a wide state thereof; and FIG. 7C is a perspective view illustrating a tele-state thereof;

FIG. 8A is a sectional view illustrating a folded state thereof; FIG. 10B is a sectional view illustrating a wide state thereof; and FIG. 8C is a sectional view illustrating a tele-state thereof;

FIGS. 10A to 10C show a collapsible lens having a night shooting function according to related art; FIG. 10A is a sectional view illustrating a folded state thereof; FIG. 10B is a sectional view illustrating a wide state thereof; and FIG. 10C is a sectional view illustrating a tele-state thereof;

FIG. 11A is a sectional view illustrating a state in which the infrared cutoff filter is placed on the optical axis thereof; and FIG. 11B is a sectional view illustrating a state in which the infrared cutoff filter is moved out of the optical axis thereof;

DETAILED DESCRIPTION OF THE PREFERRED EMBODIMENTS

Figure 1A:
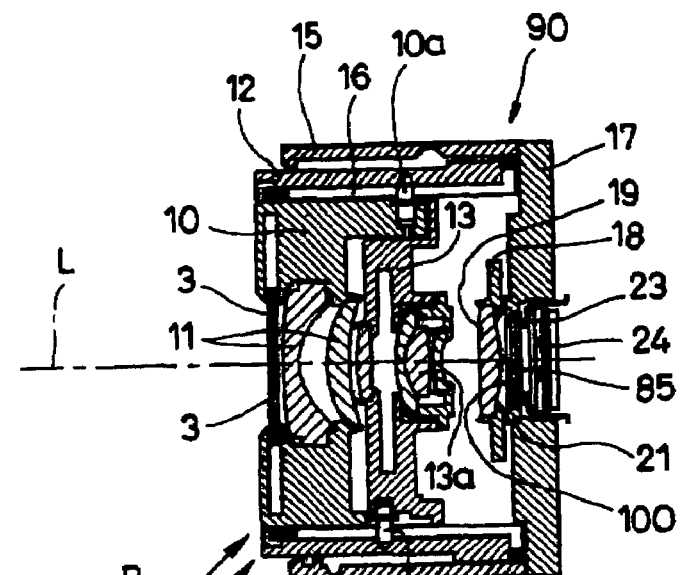
FIGS. 1A to 1C show a collapsible lens according to the present invention.

Hereinafter, an optical unit having an optical barrel and collapsible lens and an imaging apparatus having the optical unit according to preferred embodiments of the present invention will be described in detail with reference to the accompanying drawings.

In the present invention, the infrared cutoff filter is replaced with a liquid crystal panel or an EC device. Hereinafter, the configuration of an optical unit is described by referring to FIGS. 1A to 1C, 2A, 2B, 3A to 3C, and 4. Incidentally, constituent elements thereof, which are the same as those described with reference to FIGS. 8A to 8C, 10A to 10C, 11A and 11B are designated by same reference numerals in FIGS. 1A to 1C, 2A, 2B, and 3A to 3C.

Figure 1B:
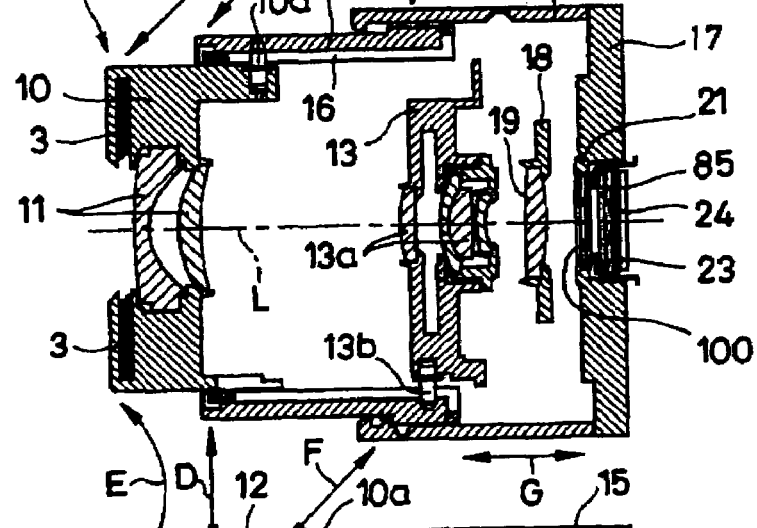
Figure 1C:
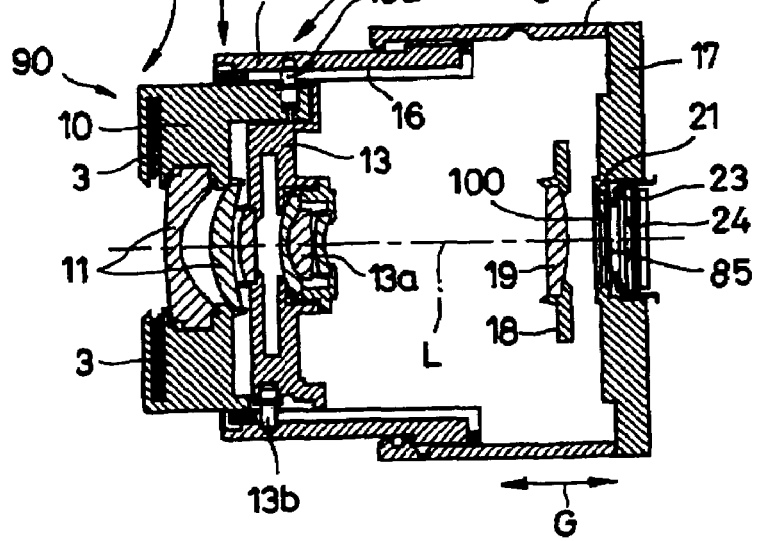
Figure 2A:
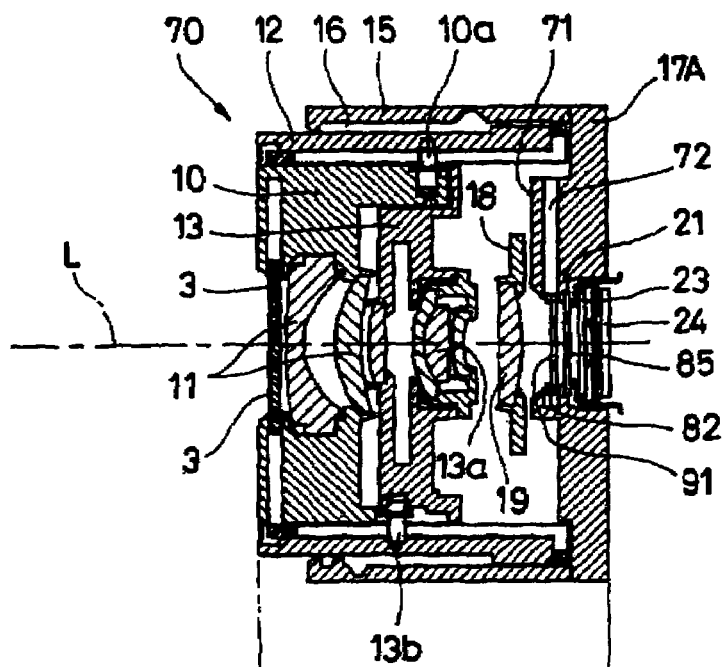
FIGS. 2A and 2B illustrate, by comparison, a folded state of a collapsible lens according to the present invention and that of a related art collapsible lens.
Figure 2B:
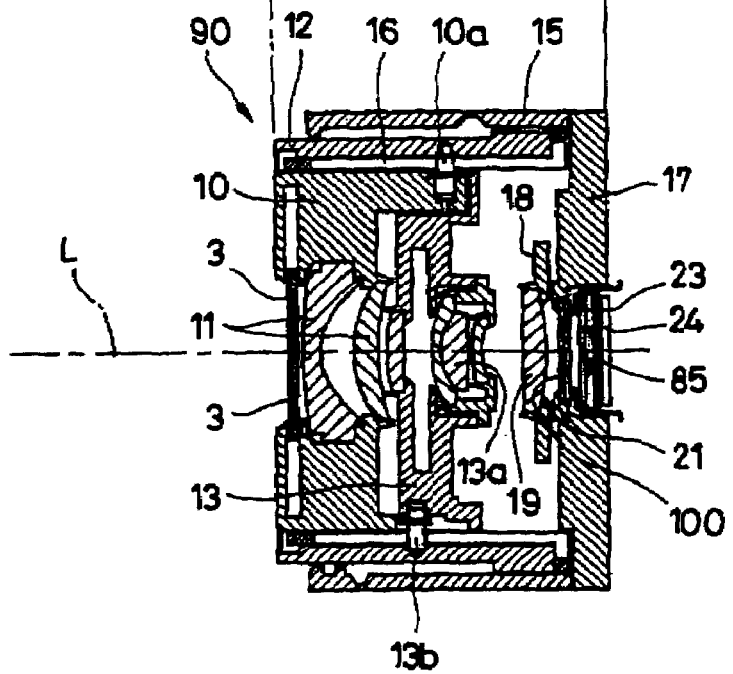
Figure 3A:
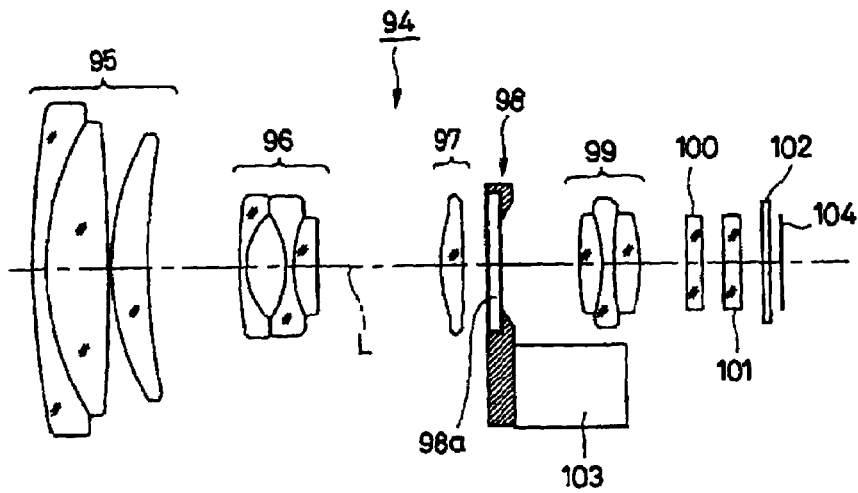
FIGS. 3A to 3C illustrate a zooming operation and a focusing operation of a fixed barrel type lens according to the present invention.
Figure 3B:
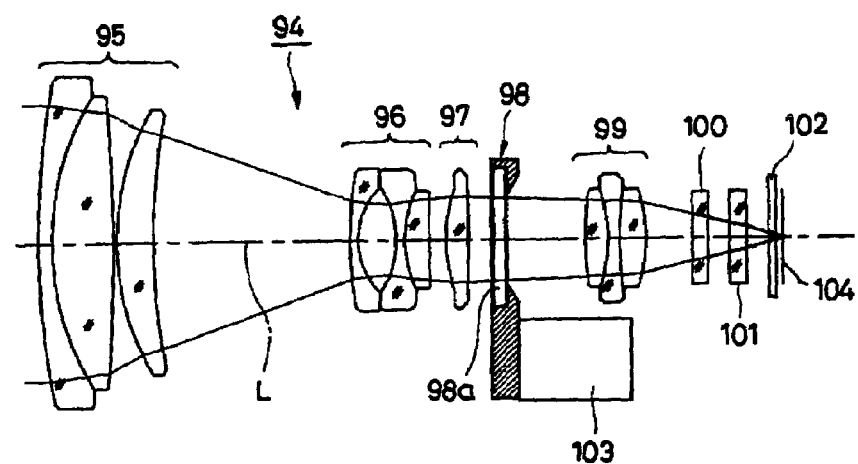
Figure 3C:
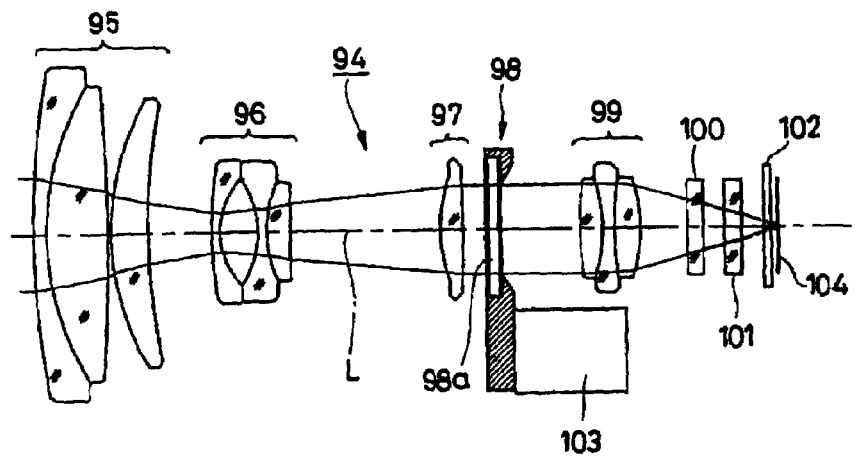
Figure 4:
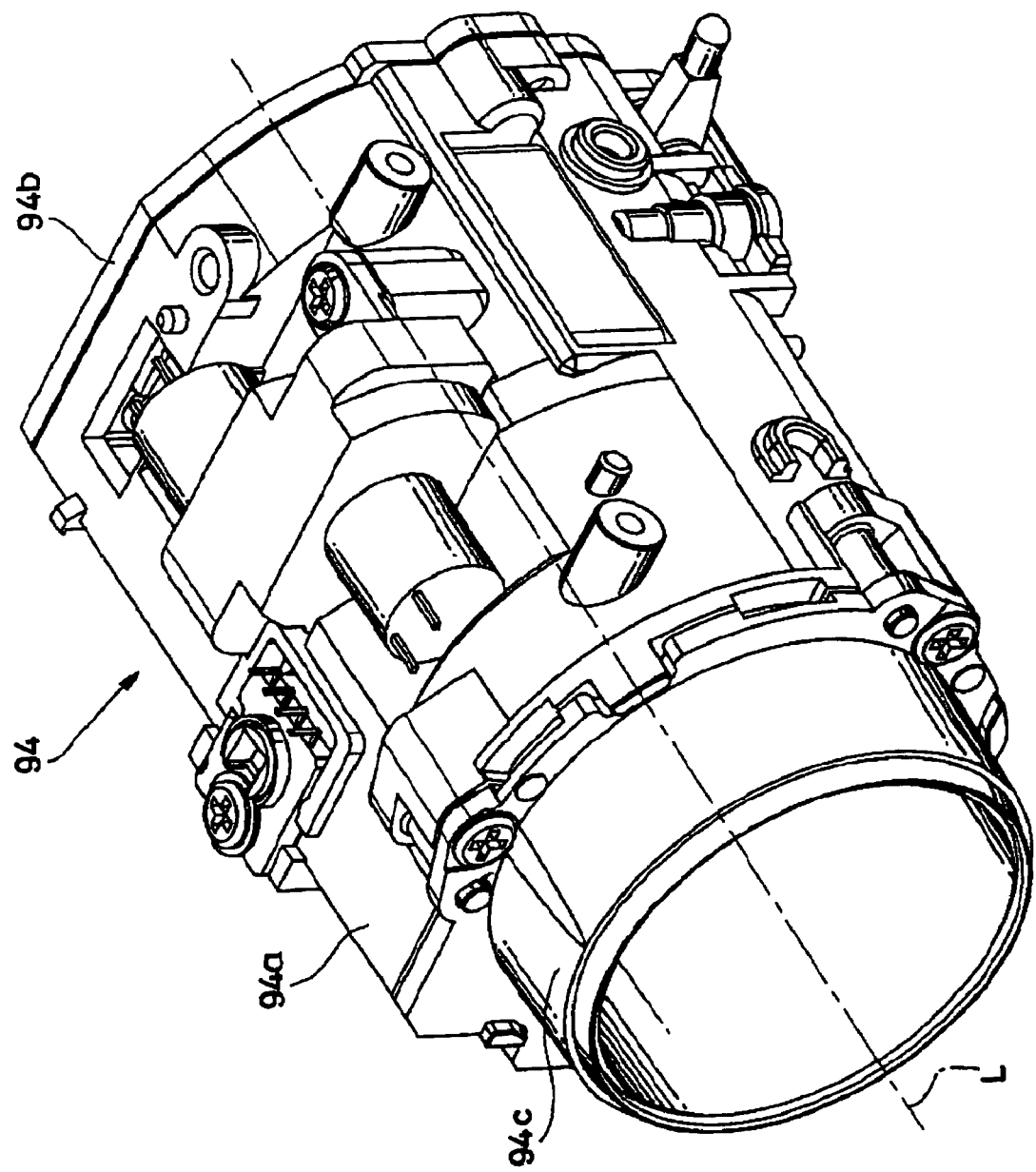
FIG. 4 is a perspective view illustrating an embodiment of a fixed barrel type lens according to the present invention.
Figure 5:
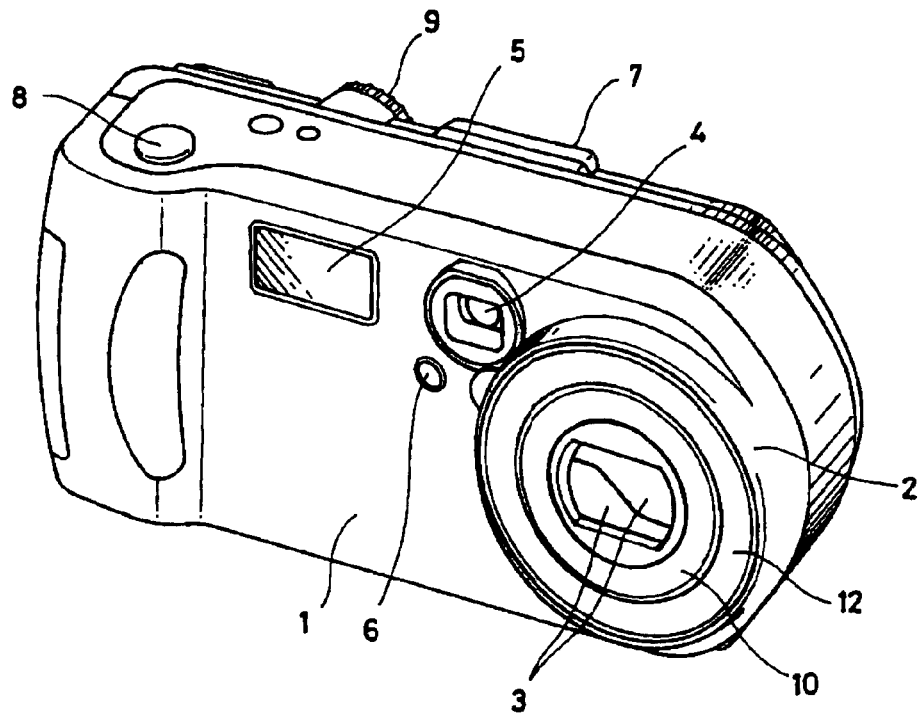
FIG. 5 is a perspective view illustrating an outside appearance of a digital still camera whose optical unit is in a folded state.
Figure 6:
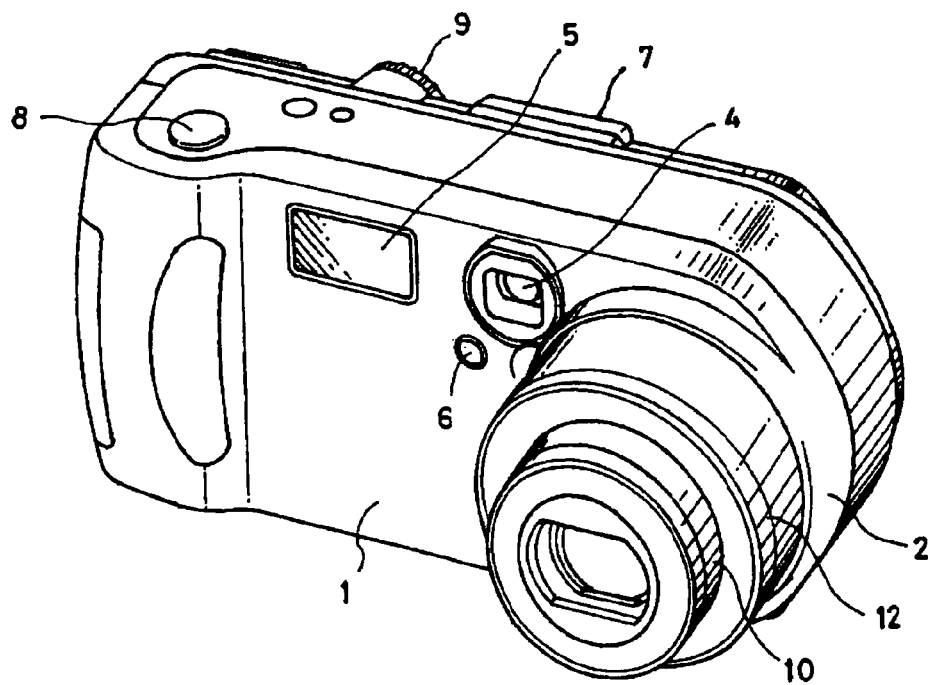
FIG. 6 is a perspective view illustrating the outside appearance of a digital still camera whose optical unit is extended into a wide state or in a tele-state.
Figure 7A:
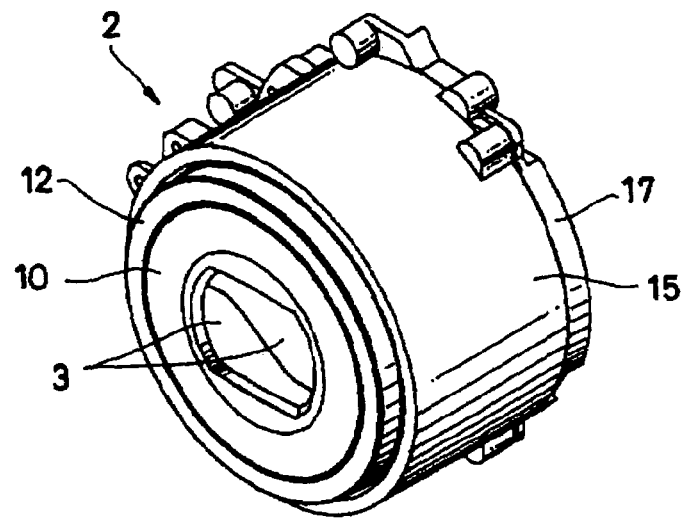
FIGS. 7A to 7C show the outside appearance of the optical unit.
Figure 7B:
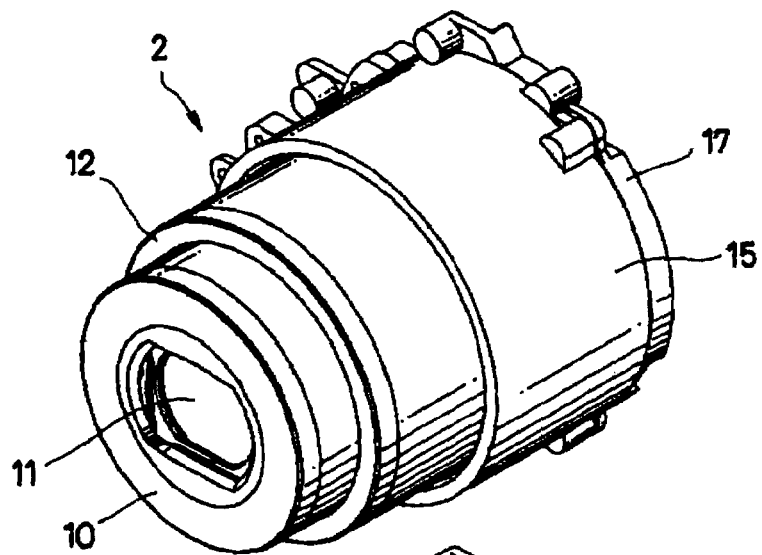
Figure 7C:
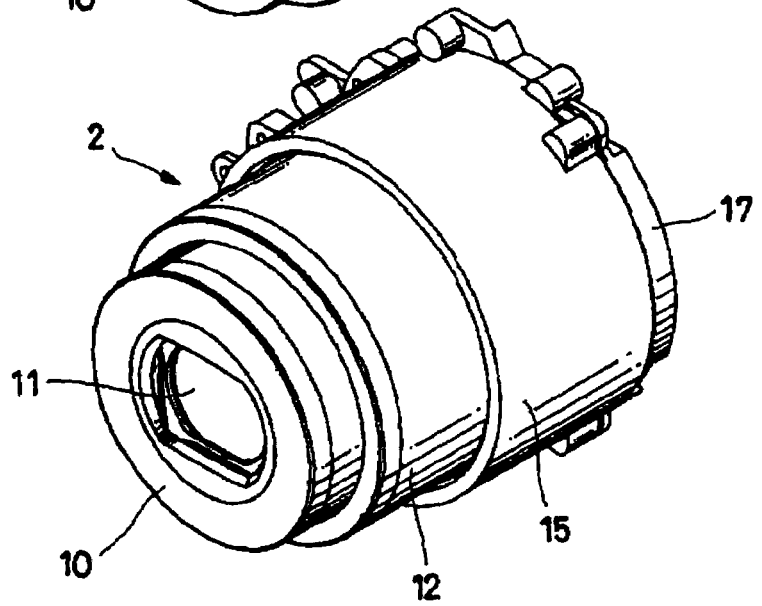
Figure 8A:
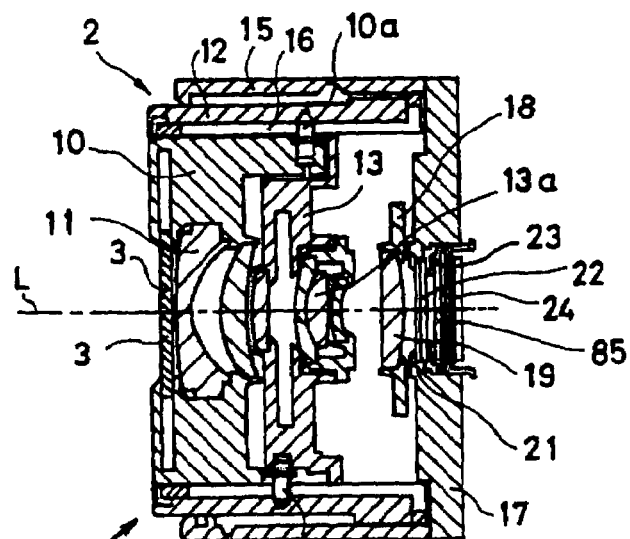
FIGS. 8A to 8C show a related art collapsible lens, which does not have a night shooting function.
Figure 8B:
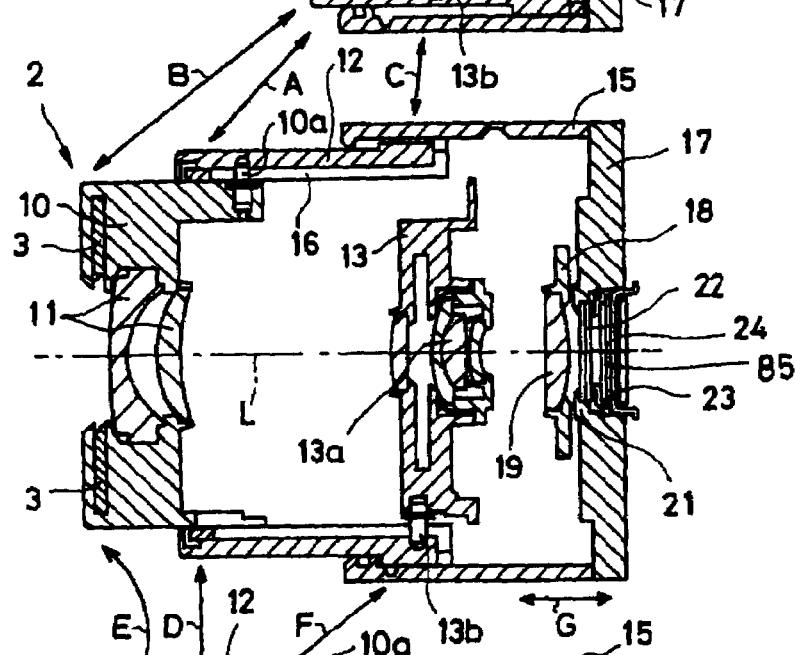
Figure 8C:
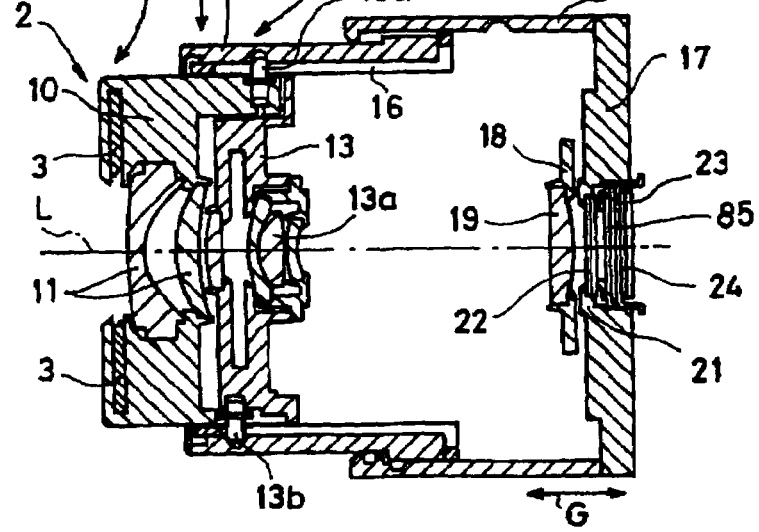
Figure 9:
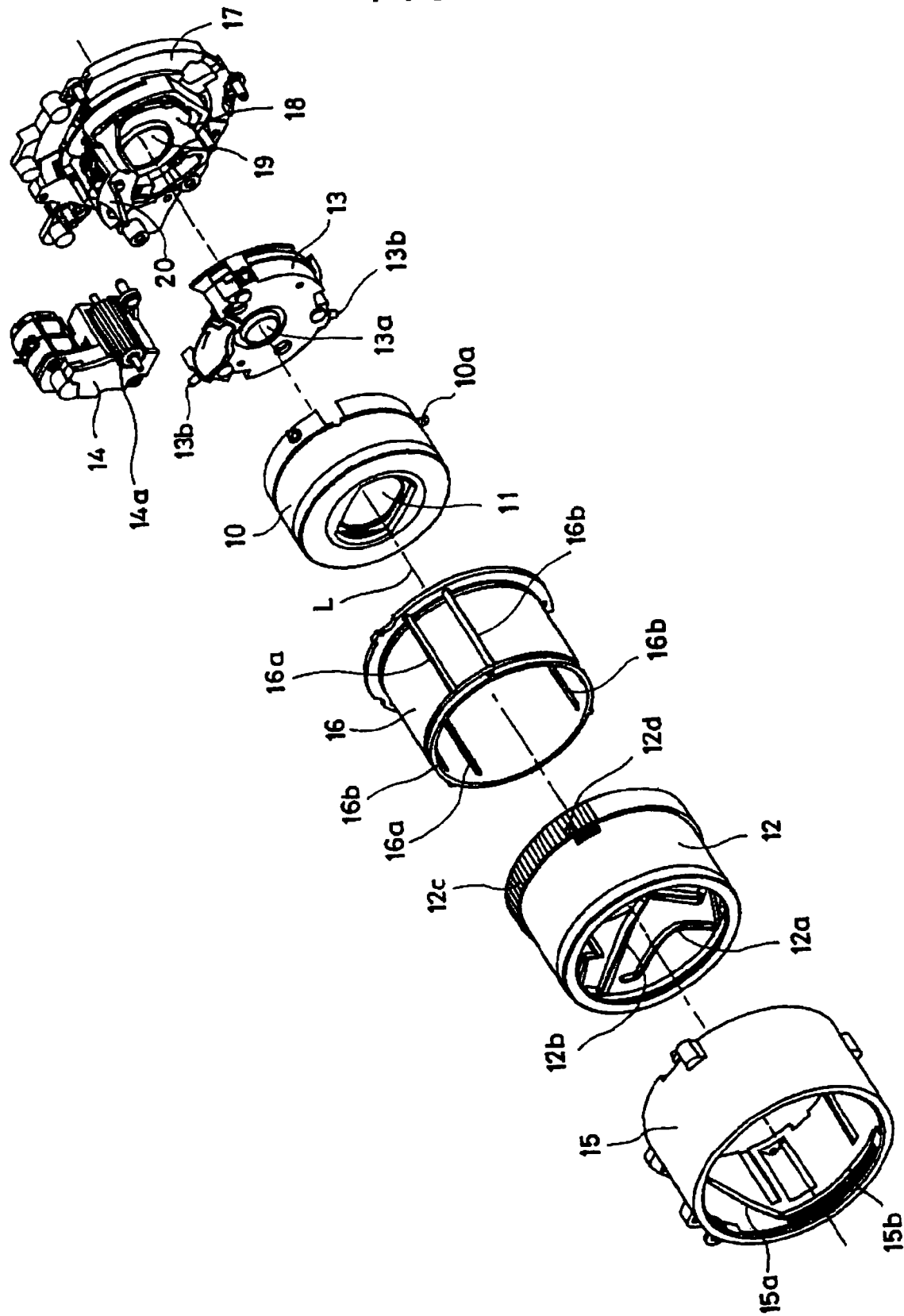
FIG. 9 is an exploded perspective view illustrating the collapsible lens shown in FIGS. 8A to 8C.
Figure 11A:
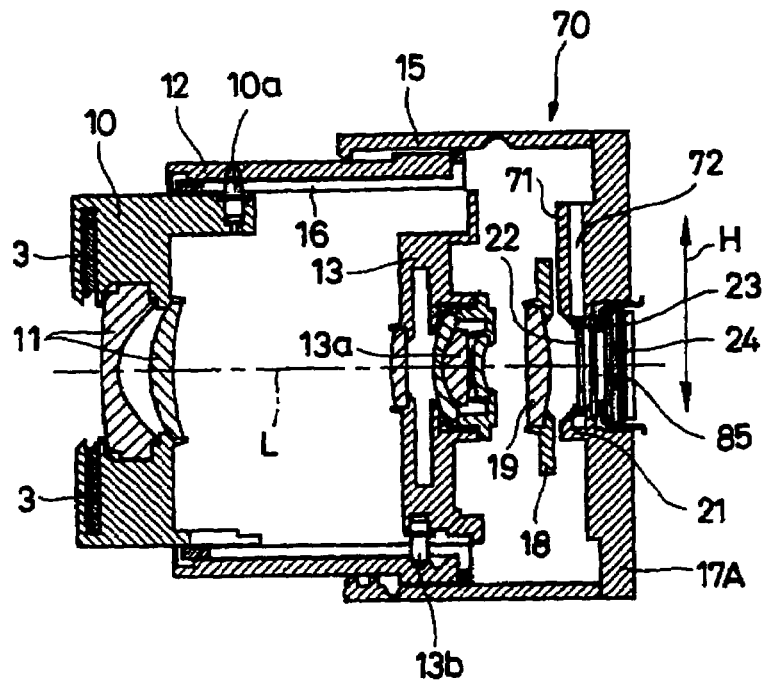
FIGS. 11A and 11B illustrate an operation of placing an infrared cutoff filter on and retreating the infrared cutoff filter from an optical axis of the collapsible lens shown in FIGS. 10A to 10C, which has the night shooting function.
Figure 11B:
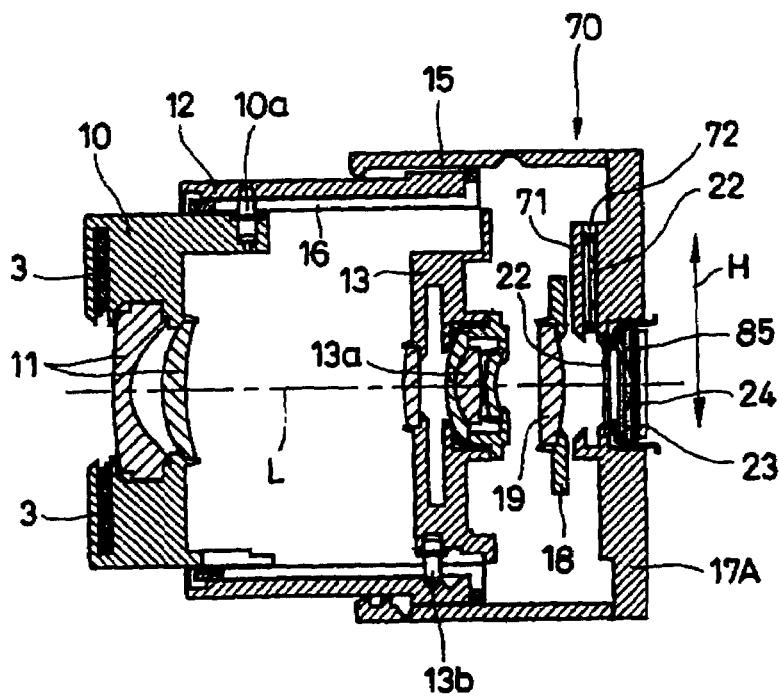

FIGS. 1A to 1C are sectional views of a collapsible lens according to the present invention. FIG. 1A illustrates the state thereof put in a folded position in which the lens is stored when the lens is not used. FIG. 1B illustrates the state thereof in a wide position (that is, a wide angle position) of the lens. FIG. 1C illustrates the state thereof in a tele-position (that is, a telephoto position). FIGS. 2A and 2B are sectional views illustrating an operation of moving out and in an infrared cutoff filter. FIGS. 3A to 3C are explanatory sectional views illustrating a zooming operation and a focusing operation of a fixed barrel type lens according to the present invention. FIG. 4 is a perspective view illustrating an example of an optical barrel of the fixed barrel type lens according to the present invention.

The configuration of the entire collapsible lens (that is, the entire imaging lens portion) 90 is almost similar to that of the related art collapsible lens having "the night shot function, which can perform night shooting" and which has been described with reference to FIGS. 10A to 10C. Thus, an outline of the configuration of the entire lens is briefly described hereinbelow, and differences between the collapsible lens 90 and the related art collapsible lens are described in detail hereinbelow.

In FIGS. 1A to 1C, reference numeral 10 designates a first group lens frame for holding a plurality of lenses 11.

Reference numeral 12 denotes a cam ring for holding the first group lens frame 10 in such a way as to be able to move in the direction of an optical axis. Reference numeral 13 designates a second group lens frame for holding a plurality of lenses 13a.

Reference numeral 16 denotes a rectilinear guide ring for holding the second group lens frame 13 in such a manner as to be able to move in the direction of the optical axis. Reference numeral 15 denotes a fixed ring for holding the cam ring 12 in such a way as to be able to move in the direction of the optical axis. The fixed ring 15 is integrally fixed on a front face of a rear barrel 17.

Incidentally, a zooming operation and what is called a wide operation, which is reverse equivalent of the zooming operation, of the first group lens frame 10 holding the plurality of lenses 11 and the second group lens frame 13 holding the plurality of lenses 13a are similar to those described by referring to FIGS. 10A to 10C. Additionally, the zooming operations of the lens frames 10 and 11 are caused by the cam ring 12, which rotation-drives the lens frames 10 and 11 in such a way as to move the lens frames from the folded position shown in FIG. 1A to the wide position shown in FIG. 1B and from the wide position shown in FIG. 1B to the tele-position shown in FIG. 1C.

FIGS. 3A to 3C illustrate a lens group to be attached to an imaging lens portion 94 that is a fixed barrel as shown in FIG. 4. The imaging lens portion 94 is configured to have, opposing to an object to be imaged, a first fixed lens group 95, a zoom lens group 96, a second fixed lens group 97, an iris unit 98, a focusing lens group 99, an infrared transmission amount adjusting means 100, an optical lowpass filter 101, and a solid state image sensor 102.

The first fixed lens group 95 is fixed to a leading end portion on an optical axis L. A second fixed lens group 97 is placed behind the lens group 95 by leaving a predetermined space therebetween. The lens group 97 fixed to the imaging lens portion 94. A zoom lens group 96, which is supported by the imaging lens portion 94 in such a way as to be able to move in the direction of the optical axis, is placed between the first fixed lens group 95 and the second fixed lens group 97. A zooming operation is performed by moving this zoom lens group 96. When the zoom lens group 96 is made to come close to the first fixed lens group 95, the lens groups are brought into a tele-side (that is, a telephoto side). When the zoom lens group 96 is made to come close to the second fixed lens group 97, the lens groups are brought into a wide-side (that is, a wide angle side).

The iris unit 98 adjusts an amount of light passing on the optical axis L of the imaging lens portion 94, and configured to have a shutter portion 98a placed on the optical axis L, and a drive motor 103 for causing this shutter portion 98a to perform opening and closing operations. The shutter portion 98a of the iris unit 98 is placed behind the second fixed lens group 97. The focusing lens group 99 is placed behind the shutter portion 98a. The infrared transmission amount adjusting means 100, the optical lowpass filter 101, and the solid state image sensor 102 are disposed behind the focusing lens group 99 from the front side in this order. A focusing operation is performed by moving the focusing lens group 99 in the direction of the optical axis L.

The infrared transmission amount adjusting means 100 may include, for example, a liquid crystal panel or an EX device. The liquid crystal panel is enabled to adjust an amount of transmitted electromagnetic wave (or light), such as infrared radiation. The use of this liquid crystal panel facilitates automatic exposure control under a wider range of shooting conditions from night shooting conditions to daylight shooting conditions. The EC device controls transmission of light by utilizing an electro-chromic phenomenon (hereunder referred to as "EC phenomenon"). The optical transmittance of a certain substance and the wavelength of light, which is transmitted by the substance, may be electrically controlled by electrically causing an ion conductor to perform a redox reaction to thereby change optical absorption spectra of the substance.

The liquid crystal panel or the EC device is used as the infrared transmission amount adjusting means 100. When power is turned on, infrared light is cutoff or absorbed. When the power is turned off, infrared light is transmitted. Thus, advantages similar to those obtained by placing an infrared cutoff filter on the optical axis and by retracting the infrared cutoff filter therefrom can be achieved without using the infrared cutoff filter. Needless to say, conversely, the infrared transmission amount adjusting means 100 maybe adapted so that when the power is turned off, infrared light is transmitted, and that when the power is turned on, infrared light is cutoff or absorbed. Incidentally, it may be the most preferable that the infrared transmission amount adjusting means 100 is placed between the focusing lens group 99 and the optical lowpass filter 101, which are shown in FIGS. 3A to 3C (the diameters thereof can be reduced). Alternatively, the infrared transmission amount adjusting means 100 may be placed between the first fixed lens group 95 and the second fixed lens group 97. Furthermore, the infrared transmission amount adjusting means 100 may also be placed between the iris unit 98 and the focusing lens group 99.

FIG. 4 is a perspective view illustrating an external appearance of the imaging lens portion 94 of the digital video camera, and shown a practical example of an optical barrel. This imaging lens portion 94 consists of a cylindrical body portion 94a, a rear plate portion 94b attached to the rear end part of this body portion 94a, and a front cylindrical portion 94c attached to the front end part of the body portion 94a, which are fixed by a plurality of fixing screws in such a way as to be integral with one another.

Figure 12:
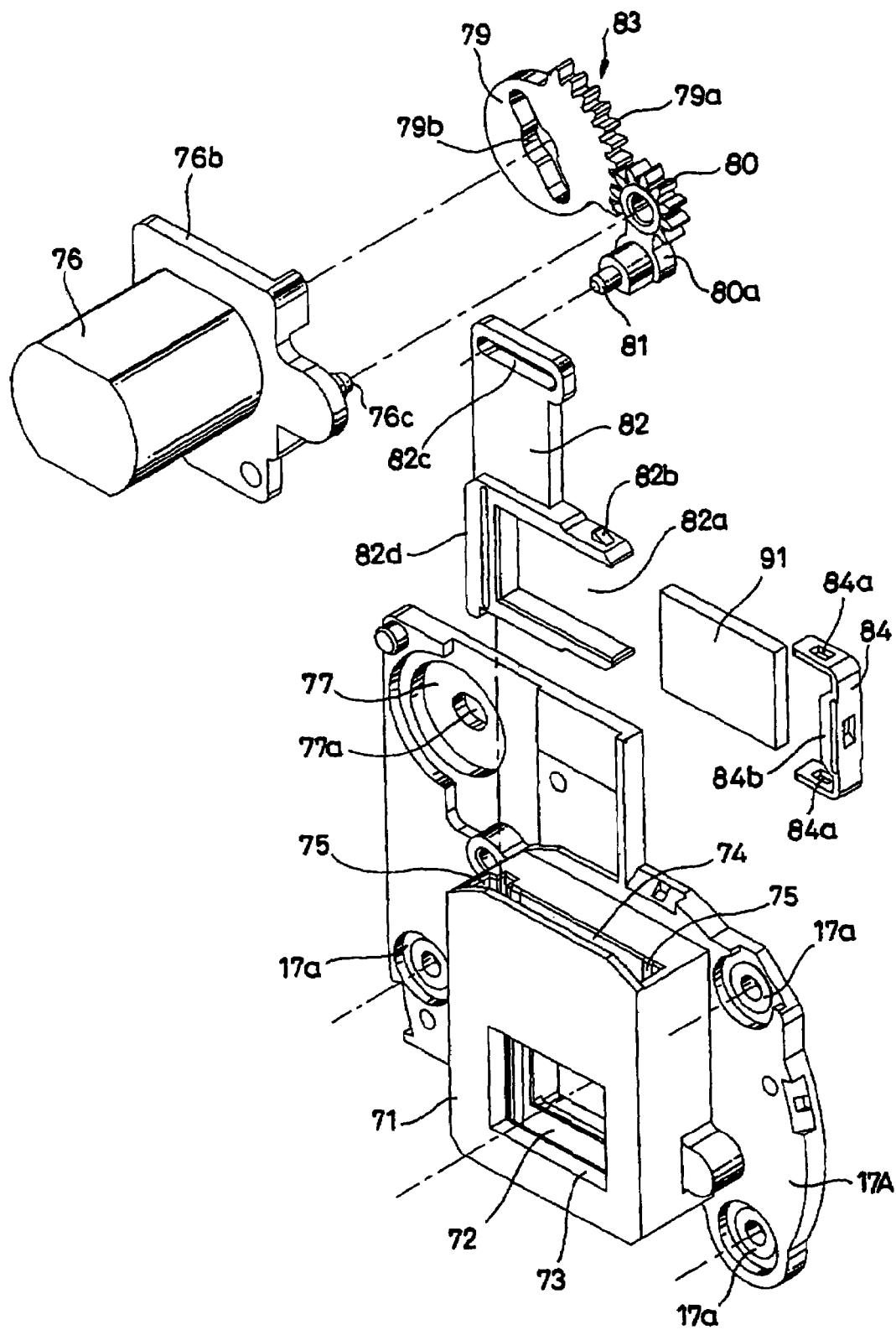
FIG. 12 is an exploded perspective view illustrating a retreating means for retreating the infrared cutoff filter of the collapsible lens having the night shooting function, as shown in FIGS. 10A to 10C, which is taken from front side thereof.
Figure 13:
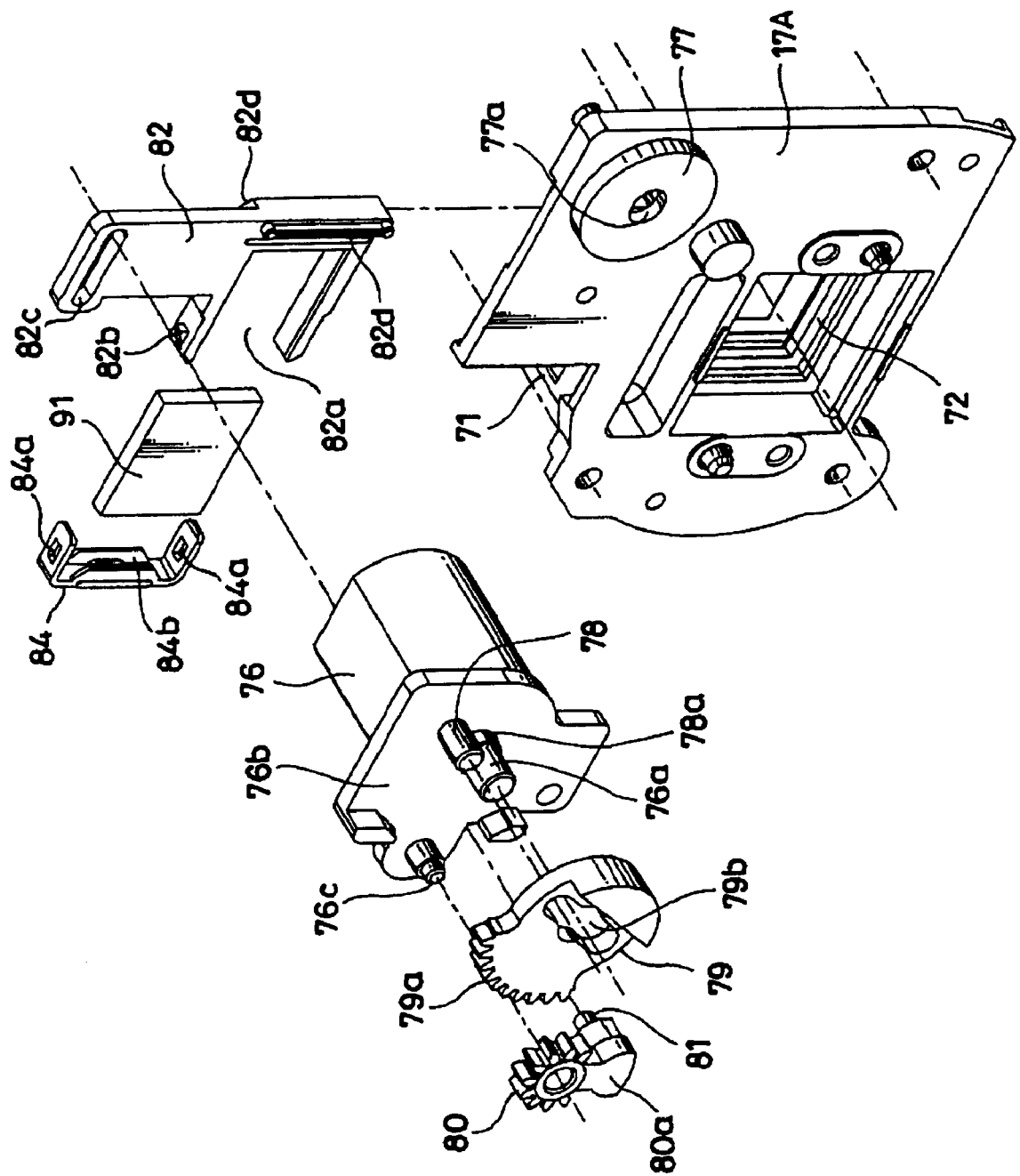
FIG. 13 is an exploded perspective view illustrating the retreating means for retracting the infrared cutoff filter of the collapsible lens having the night shooting function, as shown in FIGS. 10A to 10C, which is taken from rear side thereof.

According to the above-mentioned embodiment, the night shooting is enabled without using any of the infrared cutoff filter, a filter holder for holding the infrared cutoff filter, an elastic member for fixing the infrared cutoff filter to the filter holder, a motor nor a gear train, which are used for moving the infrared cutoff filter, as described by referring to FIGS. 12 and 13. Accordingly, the above-mentioned night shot function and the night framing function may be achieved. As is understood from the comparison between the related art collapsible lens 70 shown in FIG. 2A and the collapsible lens 90 according to the present invention shown in FIG. 2B, which are in the folded state, the thickness of the collapsible lens 90 according to the present invention may be reduced by an amount of the difference in thickness T in such a manner as to be thinner than the related art collapsible lens 70. Accordingly, according to the present invention, the reduction in the thickness of the collapsible lens may be achieved.

The present invention is not limited to the above-mentioned and illustrated embodiments. Various modifications may be made in the present invention without departing from the spirit and scope thereof.

For example, although it has been described in the foregoing description of the embodiment that the crystal light panel or the EC device are employed as the infrared transmission amount adjusting means, needless to say, other devices and apparatuses may be applied thereto as long as an mount of infrared light can be adjusted. The lens configurations of the fixed barrel type lens and the collapsible lens are not limited to those of the embodiments described above. The method of driving the collapsible lens is also not limited to the method employed in the embodiments described above. The drive source is not limited to a stepping motor. An ultrasonic motor and an ordinary DC motor may also be used as the drive source.

A gear unit may not be always needed. For example, a direct drive system using an ultrasonic wave motor and a linear motor maybe employed. The folding structure of the collapsible lens is not limited to a cam mechanism having a cam groove and cam pins. As long as an optical lens system may be accommodated in this space, various mechanisms, for instance, a ball screw type mechanism, a rack-and-pinion type mechanism, and a linear motor mechanism may also be employed.

As above-mentioned, the optical unit according to the present invention is provided with the infrared transmission amount adjusting means enabled to adjust an amount of transmitted infrared electromagnetic wave is installed at a front side portion on the optical axis of the imaging means. Accordingly, the present invention can obtain the following advantages. That is, an infrared cutoff filter and a drive mechanism for moving out and in the infrared cutoff filter can be saved. Moreover, the configuration of the optical unit can be simplified. Furthermore, the night shot function and the night framing function can be ensured. A further reduction in thickness and size of the optical barrel and collapsible lens is enabled.

Further, the imaging apparatus having the optical unit according to the present invention can use an optical unit enabled to achieve miniaturization thereof. Therefore, reduction in size and thickness of the entire imaging apparatus can be achieved.

What is claimed is:

1. An imaging apparatus for night shooting imaging without an infrared cutoff filter comprising: an optical barrel, a fixed barrel disposed at a rear side portion on an optical axis of said optical barrel, at least one lens barrel being movable along said optical axis with respect to said fixed barrel, a series of lens groups disposed on said optical axis comprised of a first fixed lens group, a movable zoom lens group, a second fixed lens group and a focus lens group arranged in series, an iris disposed between said second fixed lens group and said focus lens group for adjusting an amount of light passing on said optical axis; a solid-state image sensor disposed at a backside portion on the optical axis of said lens barrel for receiving light passed by said iris, and an electro-chromic infrared adjuster provided on said optical axis and interposed between said iris and said focus lens group, said electro-chromic infrared adjuster having a transmiffance to infrared wavelengths electrically controlled to adjust an amount of infrared electromagnetic wave to be transmitted therethrough to said image sensor.

* * * * *